US011397906B1

(12) United States Patent
Fillebeen et al.

(10) Patent No.: US 11,397,906 B1
(45) Date of Patent: Jul. 26, 2022

(54) PREDICTING DEMAND FOR ROUTE GENERATION

(71) Applicant: Amazon Technologies, Inc., Seattle, WA (US)

(72) Inventors: Thomas Fillebeen, Seattle, WA (US); Ziyan Huang, Bellevue, WA (US); Joshua Hum, Bothell, WA (US); Felipe Lagos, Seattle, WA (US); Robert McDonald, Snoqualmie, WA (US); Prashanth Paramanandan, Snoqualmie, WA (US); Margaret P. Pierson, Seattle, WA (US); John Schroder, Bothell, WA (US); Wilko Ziggy Schulz-Mahlendorf, Seattle, WA (US); Meghna Singla, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 639 days.

(21) Appl. No.: 16/162,250

(22) Filed: Oct. 16, 2018

(51) Int. Cl.
*G06Q 10/06* (2012.01)
*G06F 9/48* (2006.01)
(Continued)

(52) U.S. Cl.
CPC ....... *G06Q 10/06315* (2013.01); *G06Q 10/04* (2013.01); *G06Q 10/06311* (2013.01); *G06Q 10/08355* (2013.01); *G06Q 30/0202* (2013.01)

(58) Field of Classification Search
None
See application file for complete search history.

(56) References Cited

U.S. PATENT DOCUMENTS 6,138,103 A * 10/2000 Cheng .................... G06Q 10/04
  705/7.37
6,216,108 B1 * 4/2001 LeVander .......... G06Q 30/0203
  705/400

(Continued)

FOREIGN PATENT DOCUMENTS

WO   WO-2014008386 A2 * 1/2014 ........... G05B 19/418

OTHER PUBLICATIONS

Marcel et al "Vehicle Routing with Driver Learning for Real World CEP Problems",, IEEE, Nov. 8, 2011, pp. 1315-1322 (Year: 2011).*

(Continued)

*Primary Examiner* — Romain Jeanty
(74) *Attorney, Agent, or Firm* — Patterson + Sheridan, LLP

(57) ABSTRACT

Embodiments herein describe a predictive delivery planning system that includes a forecaster that predicts simulated orders (e.g., forecasted orders) for multiple different demand scenarios. Once the simulated orders are selected, a route planner can generate routes for delivering the simulated and actual customer orders for each scenario. The planning system then converts these routes in labor plans indicating the amount of time a delivery driver would need to deliver the orders. The planning system identifies a set of labor blocks from the labor plans and determines whether these blocks satisfy a utilization threshold. Put differently, the planning system uses a releasing policy that releases labor blocks whose expected utilization is higher than a predetermined threshold. The released labor blocks are then displayed to delivery drivers who can then select how many of the labor blocks they would like to work.

18 Claims, 10 Drawing Sheets

(51) Int. Cl.
*G06Q 10/04* (2012.01)
*G06Q 30/02* (2012.01)
*G06Q 10/08* (2012.01)

(56) References Cited

U.S. PATENT DOCUMENTS

| | | | | |
|---|---|---|---|---|
| 7,080,026 | B2* | 7/2006 | Singh | G06Q 30/0202 |
| | | | | 705/7.31 |
| 2001/0049619 | A1* | 12/2001 | Powell | G06Q 10/06375 |
| | | | | 705/7.16 |
| 2010/0299177 | A1* | 11/2010 | Buczkowski | G06Q 50/30 |
| | | | | 705/7.13 |
| 2011/0184774 | A1* | 7/2011 | Forstall | G06Q 50/30 |
| | | | | 705/7.25 |
| 2017/0185928 | A1* | 6/2017 | Zhou | G06Q 10/083 |
| 2019/0340550 | A1* | 11/2019 | Denger | G06Q 10/04 |

OTHER PUBLICATIONS

Patric et al., "A Phased Approach to Distribution Network Optimization Given Incremental Supply Chain Change", Jun. 2012, Massachusetts of Technology pp. 1-59 (Year: 2012).*

R. Bent and P. van Hentenryck, Scenario-based planning for partially dynamic vehicle routing with stochastic customers, Operations Research 52 (2004), No. 6, 977-987.

Ilham Benyahia and J-Y Potvin, Decision support for vehicle dispatching using genetic programming, IEEE Transactions on Systems, Man, and Cybernetics—Part A: Systems and Humans 28 (1998), No. 3, 306-314.

Zhi-Long Chen and Hang Xu, Dynamic column generation for dynamic vehicle routing with time windows, Transportation Science 40 (2006), No. 1, 74-88.

Michel Gendreau, Francois Guertin, Jean-Yves Potvin, and Eric Taillard, Parallel tabu search for real-time vehicle routing and dispatching, Transportation science 33 (1999), No. 4, 381-390.

Patrick Jaillet and Michael R Wagner, Generalized online routing: New competitive ratios, resource augmentation, and asymptotic analyses, Operations research 56 (2008), No. 3, 745-757.

Ana Justel, Daniel Pe~na, and Rub en Zamar, A multivariate kolmogorov-smirnov test of goodness of fit Statistics & Probability Letters 35 (1997), No. 3, 251-259.

Roberto Montemanni, Luca Maria Gambardella, Andrea Emilio Rizzoli, and Alberto V Donati, Ant colony system for a dynamic vehicle routing problem, Journal of Combinatorial Optimization 10 (2005), No. 4, 327-343.

Victor Pillac, Michel Gendreau, Christelle Gueret, and Andres L Medaglia, A review of dynamic vehicle routing problems, European Journal of Operational Research 225 (2013), No. 1, 1-11.

Eric Taillard, Philippe Badeau, Michel Gendreau, Francois Guertin, and Jean-Yves Potvin, A tabu search heuristic for the vehicle routing problem with soft time windows, Transportation science 31 (1997), No. 2, 170-186.

Eric D Taillard, Luca M Gambardella, Michel Gendreau, and Jean-Yves Potvin, Adaptive memory programming: A uniified view of metaheuristics, European Journal of Operational Research 135 (2001), No. 1, 1-16.

Jian Yang, Patrick Jaillet, and Hani Mahmassani, Real-time multivehicle truckload pickup and delivery problems, Transportation Science 38 (2004), No. 2, 135-148.

* cited by examiner

HISTORICAL ORDER PLOT 500

PREDICTING DEMAND FOR ROUTE GENERATION

BACKGROUND

Same day delivery of customer orders requires matching customer order to driver availability. For example, a customer may order a product in the morning and expect that product to be delivered in the afternoon. A delivery planning system tries to match customer orders to driver availability in an efficient manner so that a driver can deliver the most orders within the delivery time window. In one example, a delivery planning system estimates the required labor for performing the deliveries using deliveries per hour and the total orders.

However, the current delivery planning systems have limited accuracy. For example, the current systems do not consider the physical routes that a driver may use which impacts the accuracy of the estimated labor needed to deliver the customer orders. Further, current delivery planning systems rely on a single demand scenario to estimate the labor needs. As a result, attempting to accurately identify the total customer orders is difficult.

DETAILED DESCRIPTION

Figure 1:
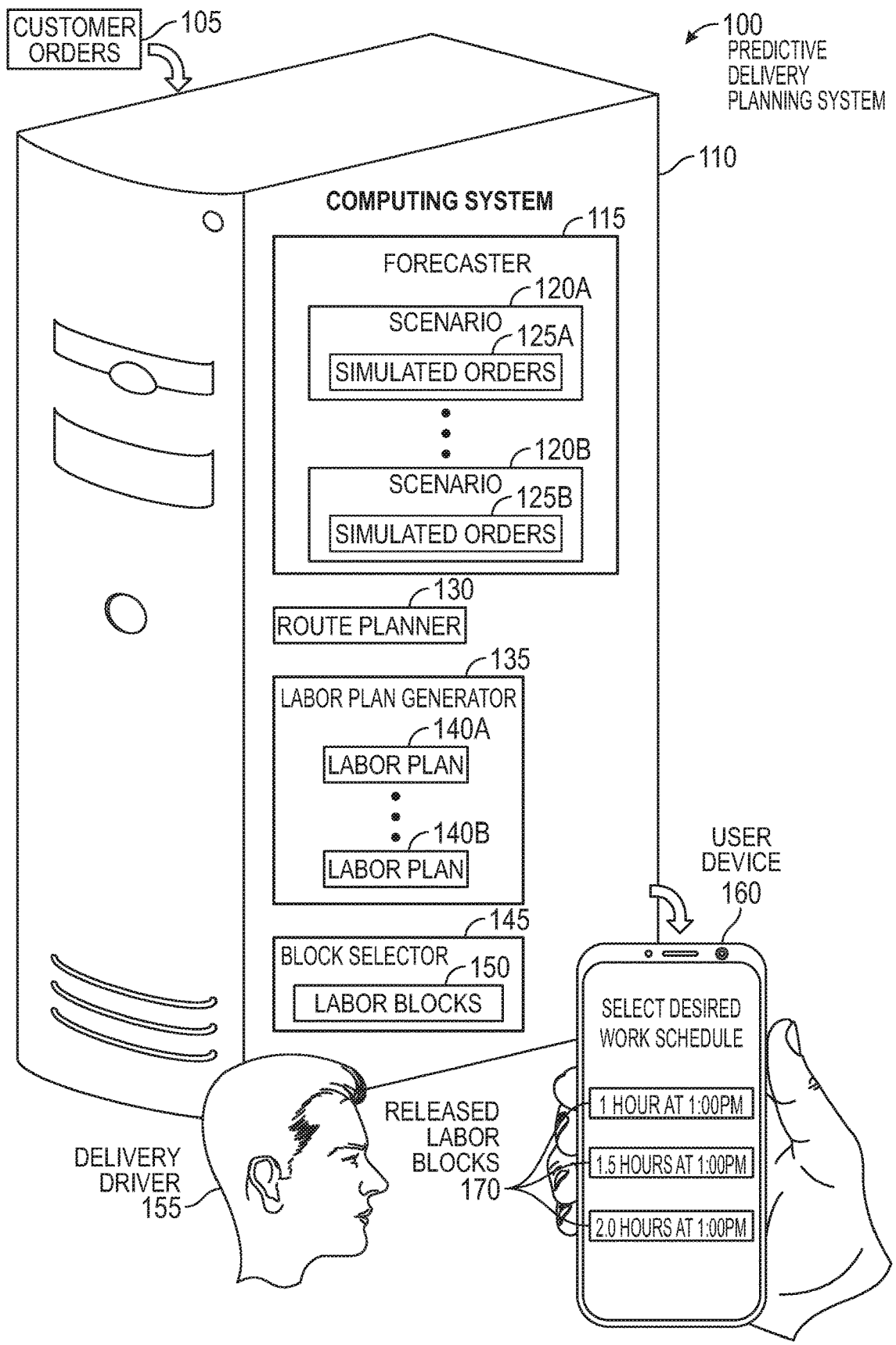
FIG. 1 illustrates a predictive delivery planning system, according to various embodiments.

Embodiments herein describe a predictive delivery planning system that includes a forecaster that predicts simulated orders (e.g., forecasted orders) for multiple different demand scenarios. That is, the planning system may have currently received only ten customer orders, but using a volume distribution for a scenario, the forecaster generates a plurality of different demand scenarios which each predict the planning system will have received a different total number of customer orders by delivery time. The forecaster can use a geographic demand distribution to then select simulated orders to make up the difference between the total number of customer orders predicted by each demand scenario and the current number of received customer orders.

Once the simulated orders are selected, a route planner generates routes for delivering the simulated and actual customer orders for each scenario. In contrast to previous solutions, the embodiments herein integrate route generation with the labor planner to predict the amount of customer orders and the amount of labor needed to deliver those orders. For example, in previous solutions, even if routing and labor planning use the same order information, it is possible for the two systems to request a different number of drivers. The embodiments herein improve efficiency by removing the costly decoupling between labor planning and routing. Also, by directly inheriting routing solver modifications (e.g., modified routes), labor planning can add, test, and leverage these changes, which minimizes the amount of compute resources used by the planning system.

The planning system converts the routes generated by the route planner into labor plans indicating the amount of time needed by a delivery driver to deliver the orders. The planning system identifies a set of labor blocks (e.g., 0.5 hour or 1 hour chunks of time) from the labor plans and determines whether these blocks satisfy a utilization threshold. Put differently, the planning system uses a releasing policy that releases labor blocks whose expected utilization is higher than a predetermined threshold. The released labor blocks are then displayed to delivery drivers who can select how many of the labor blocks they would like to work.

At increments, the planning system can repeat the process above as new customer orders are received. That is, the simulated orders in the demand scenarios are replaced with the newly received customer orders which results in the planning system updating the routes, labor plans, and the labor blocks. Thus, over time, the planning system can release additional labor blocks as those labor blocks satisfy the utilization threshold. In this manner, the planning system can predictively schedule drivers to deliver the customer orders before all (or even most) of the customer orders have been received. Once it is time to deliver the orders (and all the customer orders have been received), the planning system once more runs the customer orders through the route planner and provide routes to the delivery drivers that correspond to their selected labor blocks.

The predictive delivery planning system described herein can advantageously execute within predefined increments (e.g., every fifteen minutes) to release additional labor blocks using minimum compute resources. Moreover, the planning system reduces the total labor used to deliver the customer orders while simultaneously avoiding surge charges that can occur when labor blocks are released right before delivery time rather than at intervals well before delivery time.

FIG. 1 illustrates a predictive delivery planning system 100, according to various embodiments. The planning system 100 includes a computing system 110 which receives customer orders 105. In one embodiment, the planning system 100 schedules the customer orders 105 for same-day delivery, although the embodiments herein are not limited to such. In one embodiment, the planning system 100 establishes multiple time windows throughout the day (e.g., two hour time window) where customer orders 105 can be received and then scheduled for delivery. For example, all customer orders 105 received between 5:30-7:30 AM are scheduled for delivery at 8 AM, all customer orders 105 received between 7:30-9:30 AM are scheduled for delivery at 10 AM, all customer orders 105 received between 9:30-11:30 AM are scheduled for delivery at 12 PM, and so forth.

The customer orders 105 may trickle in throughout the time windows. For example, the customers may use a website or a smartphone application to place the orders at any time during the two-hour time windows. As such, at 5:45 AM, the planning system 100 may have received ten orders for the 5:30-7:30 AM time window. However, by 7:29 AM, the planning system 100 may have received sixty orders. Rather than waiting until 7:30 to attempt to determine how much labor (e.g., manpower) is needed to deliver the customer orders 105, the predictive delivery planning system 100 uses the elements in the computing system 110 to predict and release labor blocks using incomplete data (e.g., without yet knowing the total number of orders received in the time window as well as the geographic distribution of those orders).

The computing system 110 (which can be a single computing system such as a server, a plurality of computing systems, or a data center or cloud based infrastructure) includes a forecaster 115, a route planner 130, a labor plan generator 135, and a block selector 145. The forecaster 115 generates multiple scenarios 120 which represent different demand scenarios for delivering the packages. That is, each scenario 120 can have different estimates for how many customer orders will be received in the current time window as well as the geographic distribution of those orders within the delivery area. For example, the scenario 120A may estimate that there will be seventy total customer orders 105 for the time window with 25% of those orders in a first region while the remaining 75% of the orders are in a second region. In contrast, the scenario 120B may estimate that there will be only fifty total customer orders 105 with 45% of those orders in the first region and the remaining 55% of the orders in the second region.

However, since only a portion of the customer orders 105 for the time window have been received, the forecaster 115 selects simulated orders 125 that make up the difference between current received orders and the total order estimated by each scenario 120. That is, based on already receiving ten customer orders, scenario 120A may estimate that the planning system 100 will receive a total of seventy total customer order by the time window ends, while the scenario 120B estimates the system 100 will receive a total of fifty customer orders. As such, the forecaster selects sixty simulated orders 125A for the scenario 120A and forty simulated orders 125B for the scenario 120B to make up the difference.

Once the forecaster 115 has identified the simulated orders 125 for each scenario 120, the route planner 130 can use the received (or realized) customer orders 105 and the simulated orders 125 to generate an optimized delivery route for each of the scenarios 120. Because the simulated orders 125 may be different for each scenario 120, the routes generated by the route planner 130 may also be different. For example, scenario 120A may have different routes than the scenario 120B.

The labor plan generator 135 uses the routes generated for each scenario 120 to generate a labor plan 140 for each scenario. The labor plan 140A indicates the estimated amount of time to complete the routes for the scenario 120A while the labor plan 140B indicates the estimated amount of time to complete the routes for the scenario 120B. The labor plans 140 may be expressed in the number of minutes, hours, etc. that are needed to deliver the actual and simulated orders along the routes generated by the route planner 130.

The block selector 145 converts the labor plans 140 for each scenario 120 into labor blocks. In one embodiment, a labor block has a minimum time value (e.g., an hour) that can be increased in a predefined time chunk (e.g., thirty minute increments). For example, the labor plans 140 (or a representative labor need derived from the labor plans 140) may be rounded up if they do not satisfy the requirements of the labor block—e.g. a 160 minute labor plan is rounded up to a 3 hours labor block and a 140 minute labor plan is rounded up to a 2.5 hour labor block.

The block selector 145 determines whether one or more labor blocks 150 satisfy a utilization threshold. Put differently, the block selector 145 uses a releasing policy that releases labor blocks whose expected utilization (e.g., the likelihood the labor block will be needed to satisfy the total number of customer orders received during the time window) is higher than a predetermined threshold. The released labor blocks 170 can then be displayed on a user device 160 so the blocks can be selected by a delivery driver 155.

As shown in FIG. 1, the user device 160 displays three released labor blocks 170. In this example, the delivery driver 155 can select one of the labor blocks she wishes to work. This provides flexibility to the driver 155 who can determine his or her own desired work schedule. Selecting one of the released labor blocks 170 informs the planning system 100 that the delivery driver 155 is willing to work that corresponding amount of time to deliver the customer orders 105 being received in the current time window. Later, when the time window has expired and all the customer orders 105 have been received, the planning system 100 provides the delivery driver 155 with a route that can be completed within the time frame of the labor block 170 selected by the driver 155.

While the user device 160 displays three released labor blocks 170, each labor block can represent multiple different blocks. That is, the block selector 145 may have released three 1 hour labor blocks, two 1.5 hour labor blocks, and four 2 hour labor blocks. Thus, multiple drivers 155 can view the released labor blocks 170 and select which block works best for them. As the drivers 155 select the labor blocks and a particular labor block has been exhausted (e.g., four drivers 155 have selected the four available 2 hour labor blocks), the planning system 100 can, in real-time, transmit updates to the user devices 160 to indicate there are no longer any 2 hour labor blocks available. Moreover, in addition to displaying the released labor blocks 170, the user device 160 can display a pick-up time when the driver 155 should be available to retrieve the customer orders and a payment the driver 155 receives for each of the released labor blocks 170 (which may vary in real-time depending on the availability of drivers, the number of customer orders, and the number of labor blocks).

Figure 2:
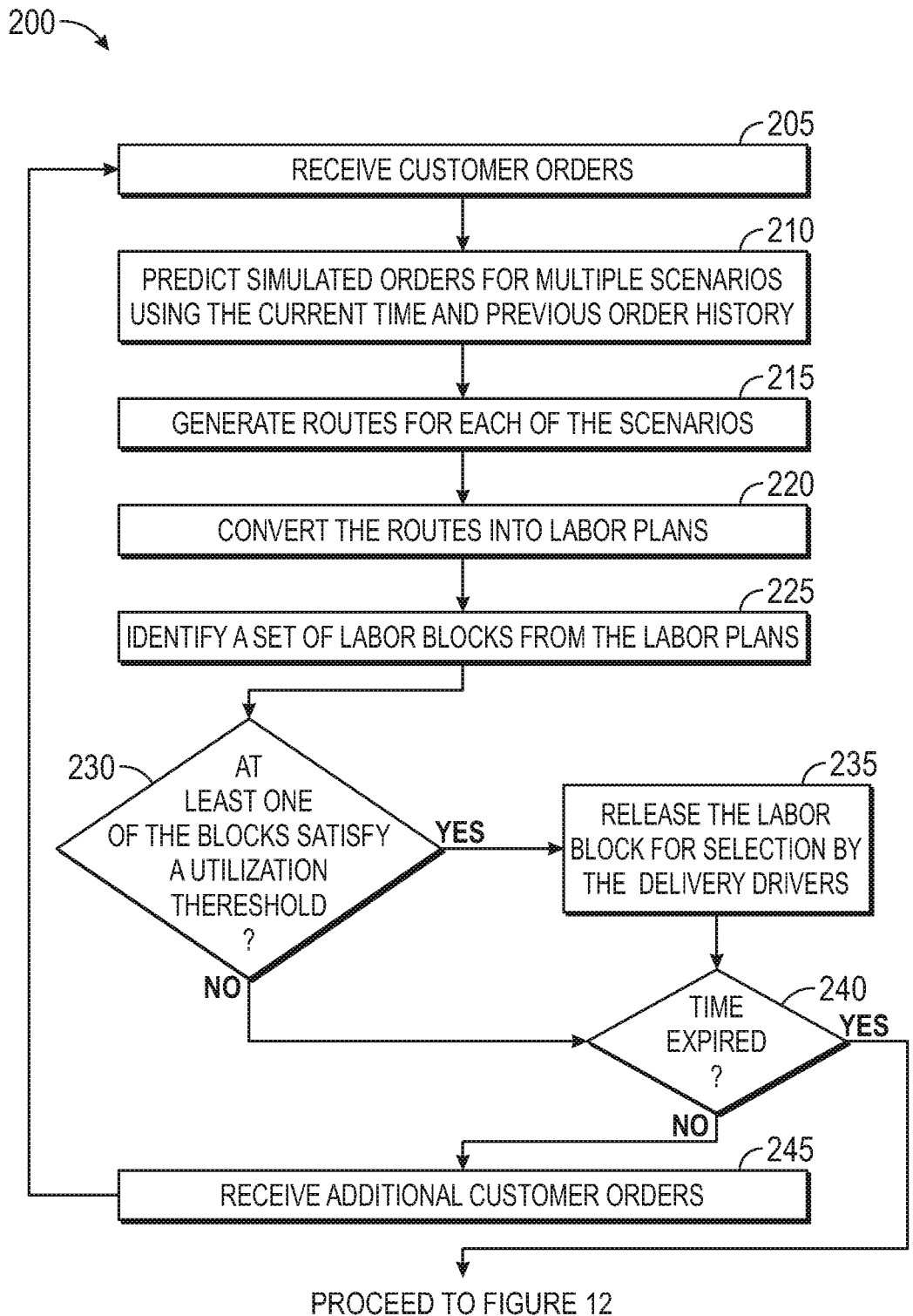
FIG. 2 is a flowchart for predictively releasing labor blocks for delivering customer orders, according to various embodiments.

FIG. 2 is a flowchart of a method 200 for predictively releasing labor blocks for delivering customer orders, according to various embodiments. For clarity, the blocks of the method 200 are discussed in tandem with FIG. 3 which illustrates data flow within a predictive delivery planning system, according to various embodiments.

At block 205, the predictive delivery planning system 300 receives the customer orders 105. As discussed above, in one embodiment, the planning system 300 uses predefined time windows to collect and then deliver customer orders received during the window. Rather than waiting until all the orders have been received, the method 200 predictively determines labor blocks which can be released to delivery drivers who can sign up in advance (i.e., before the time window has ended) to help with delivering the customer orders for same-day delivery.

Figure 3:
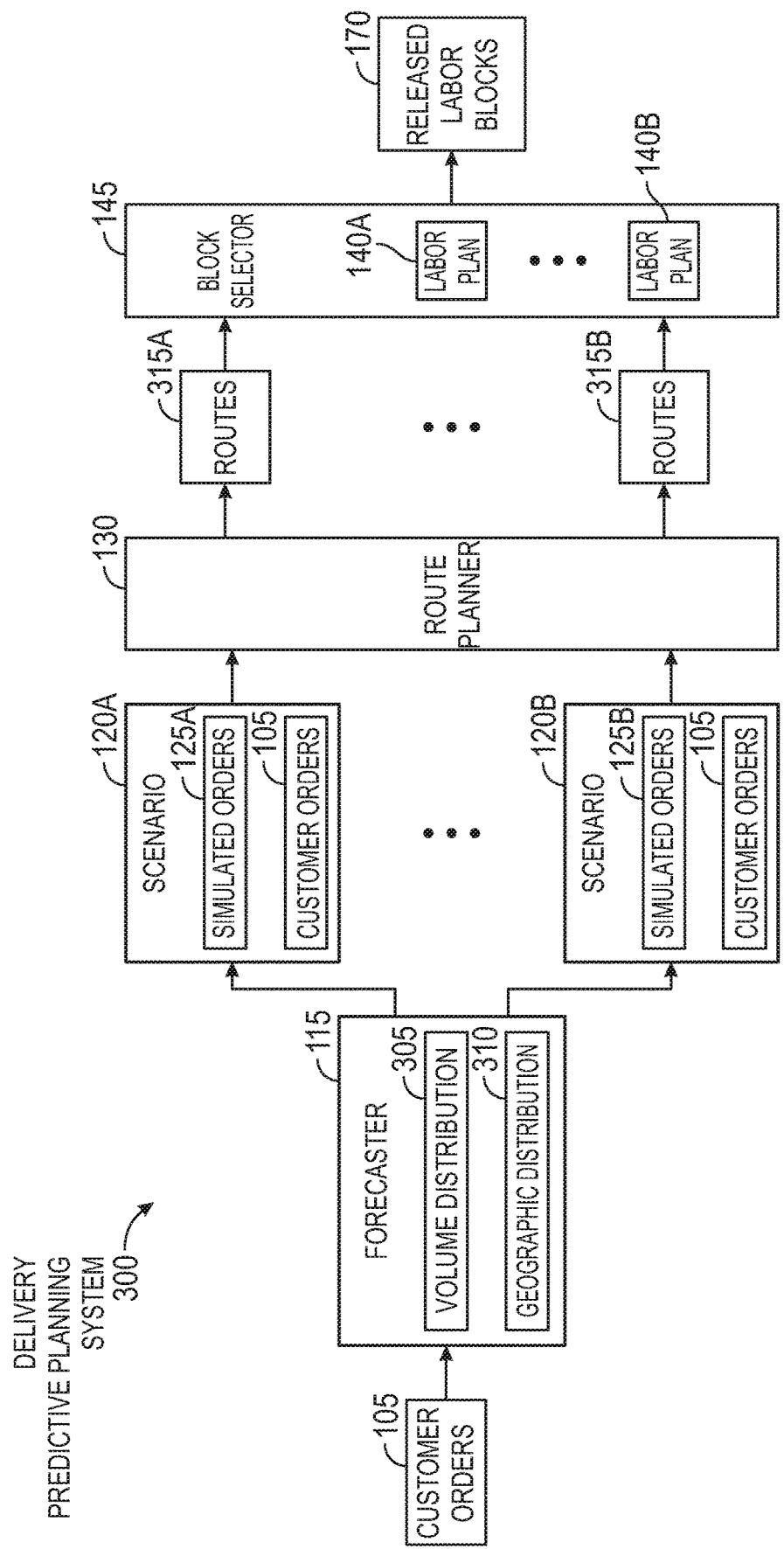
FIG. 3 illustrates data flow within a predictive delivery planning system, according to various embodiments.

At block 210, the forecaster 115 predicts simulated orders for multiple scenarios using the current time and previous order history. As shown in FIG. 3, the forecaster includes a total volume distribution 305 which, in one embodiment, may have a Normal distribution where the mean value for the distribution 305 comes from the forecast, that is currently in the production system. That is, the mean value may vary depending on the current time of day and how that maps to historical data. For example, if the current time window is at a time which historical data suggests there are a lot of customer orders, the mean value may be higher than if the current time window is at a time which historical data suggests there are fewer customer orders. Further, the mean can be adjusted based on the current number of customer numbers already received. The forecaster can take a random sample or draw from the volume distribution 305 to estimate the total number of customer orders expected for the current time window. As such, the scenarios may have different total numbers of orders which are centered around the mean value of the distribution 305.

In addition to different volume distributions 305, the forecaster 115 includes a geographic distribution 310 for each scenario. In one embodiment, the geographic distribution 310 uses a hierarchical cluster decomposition approach to determine which geographic regions to select the simulated orders 125. For example, the forecaster 115 can use the volume distributions 305 to determine the number of simulated orders 125 it should select and then use the geographic distributions 310 to determine a geographic location of the simulated order 125. Additional detail of using the volume distributions 305 and the geographic distributions 310 to select the simulated orders 125 is provided in FIG. 4.

In one embodiment, the simulated orders 125 are previous customer orders. For example, the planning system 300 may track the order histories for the last several months and then use the volume distribution 305 and the geographic distribution 310 to select one of the past customer orders to use as a simulated order 125. In this manner, the simulated orders 125 can contain actual street addresses from previous orders.

At block 215, the route planner 130 generates routes 315 for each of the scenarios. That is, the route planner 130 uses the addresses for the simulated orders 125 and the already received customer orders 105 to generate optimized routes 315 for delivering the orders. As discussed below, these routes 315 are not delivered to the delivery drivers but are instead used to estimate a labor plan 140 for each of the scenarios (e.g., an estimate of the amount of time it takes a delivery driver or drivers to deliver packages for the simulated and actual customer orders).

The embodiments herein are not limited to any particular router planning technique. In one embodiment, the route planner 130 can use a last mile delivery problem (LMDP) solver. The route planner 130 may consider various inputs to generate the routes such as package delivery time window where instead of time windows for customers, the router planner 130 considers time windows for delivered packages. The planner 130 may also consider the type of vehicles in the delivery fleet, driver's time window in which the drivers are available to make deliveries, service times for picking up and dropping off packages, time-dependent travel times which is the time it takes to travel between addresses (and can depend on the time of day), multi-depot support, penalties for deliveries scheduled during the last five minutes of the end of a delivery time window, and using total time as an objective function that is the sum of all route times plus the penalties for the last five minutes deliveries, overflow drivers and other soft constraints (where everything can be measured in seconds). The route planner 130 tries to find a feasible solution where the total time is a minimum.

At intervals, the scenarios are updated such that the simulated orders are removed and replaced with newly received actual customer orders 105. As such, the previous routes should be updated in response to some of the orders being removed by the scenario (e.g., a portion of the simulated orders 125) which are replaced by the new customer orders 105. Since the set of scenarios can potentially be large, the route planner can use a fast approach for updating routes. In one embodiment, the first step for routing plan updating is to recover a feasible solution. This is performed for two reasons: 1) the new customer orders must be incorporated in the routes (it is mandatory to visit all customers) and 2) the simulated orders may have been removed (or added in some cases).

One technique for recovering feasibility is the following. First, the route planner 130 identifies all the simulated orders that are no longer part of the scenario and removes them from the routes. This can be done by skipping these orders. Then, the route planner 130 adds all new customer orders 105. For each customer order that is not on a current route, the route planner 130 ties to add them to some route. If it cannot, the route planner 130 creates a new route that only visits that customer. For each route in which the route planner 130 can insert that customer, the planner 130 finds the position where the total route cost is the cheapest. If there is more than one route where the route planner 130 can insert the customer, it picks the cheapest one.

In one embodiment, after recovering feasibility, the route planner 130 can use an improving heuristic. For example, a CROSS exchange can be used which is a generalization of classical improving heuristics such as 2-opt or Or-opt.

At block 220, the block selector 145 converts the routes 315 into labor plans 140. That is, the block selector 145 estimates the amount of time or manpower needed to deliver packages along the routes 315. For example, the block selector 145 may add up the total time for each route in the scenario. While FIG. 3 illustrates the block selector 145 determining the labor plans 140, in another embodiment the route planner 130 may use the routes to determine the labor plans 140.

At block 225, the block selector 145 identifies a set of labor blocks from the labor plans 140. In one embodiment, after estimating the labor in each scenario, the block selector 145 computes the required labor configuration. The configuration tells what fraction of the total labor corresponds to different type of labor needs. For instance, 50% of the required labor may correspond to two hour labor needs, and 50% correspond to 2.5 hour labor needs. Using the labor needs created, the block selector 145 creates blocks trying to maximize its total utilization where one block has one or more labor needs.

The labor blocks may have to meet some requirements such as each block is at least one hour long and they have thirty minute increments, i.e., the blocks can be of 1 hour, 1.5 hours, 2 hours, 2.5 hours, etc.

At block 230, the block selector 145 determines whether at least one of the labor blocks satisfies a utilization threshold. In one embodiment, the block selector 145 uses a releasing policy that releases labor blocks whose expected utilization is higher than a predetermined threshold. The details for determining the utilization for the labor blocks is discussed in detail in FIG. 9.

If at least one of the labor blocks satisfies the utilization threshold, the method 200 proceeds to block 235 wherein the planning system 300 releases the labor block for selection by the delivery drivers. For example, the delivery drives can use personal electronic devices to select one of the released labor blocks 170 (e.g., a time period the driver wants to work).

However, if the labor blocks do not satisfy the utilization threshold, or after the labor blocks have been released, the method 200 proceeds to block 240 where the planning system determines whether the time window for accepting new customer orders has expired. For example, the deadline for accepting orders for shipping delivers at 10:00 AM may end at 9:30 AM to give time for the associates in the warehouse to gather the ordered products, package the products, and for the delivery drivers to pick up the packages and begin the routes.

Figure 11:
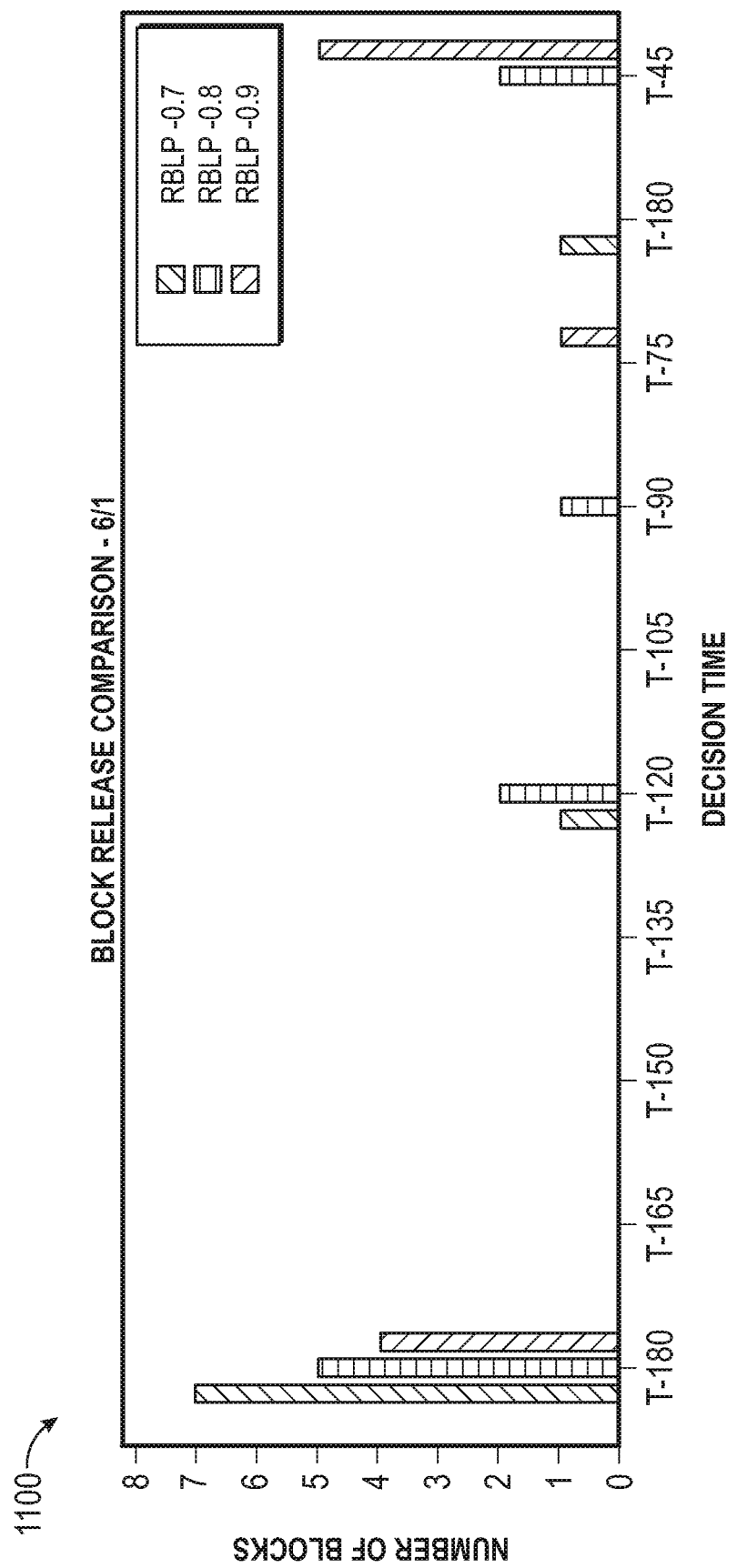
FIG. 11 is a chart illustrating releasing labor blocks using different predefined thresholds, according to various embodiments.

If the time window has expired, the method 200 proceeds to FIG. 11. However, assuming the time window has not expired, the method 200 proceeds to block 245 where the planning system 300 receives additional customer orders and then returns to block 210 to repeat the method 200. In one embodiment, the method 200 may repeat at a set time interval —e.g., every fifteen minutes. That is, every fifteen minutes, the planning system updates the scenarios, generates new routes and labor plans, and determines whether the resulting labor blocks satisfy the utilization threshold. If so, those blocks are released to the drivers for selection. However, at some intervals, the planning system 300 may not release any blocks. Over time, the likelihood the blocks will be utilized increases (and satisfy the utilization threshold) which may trigger the planning system to release additional blocks.

Figure 4:
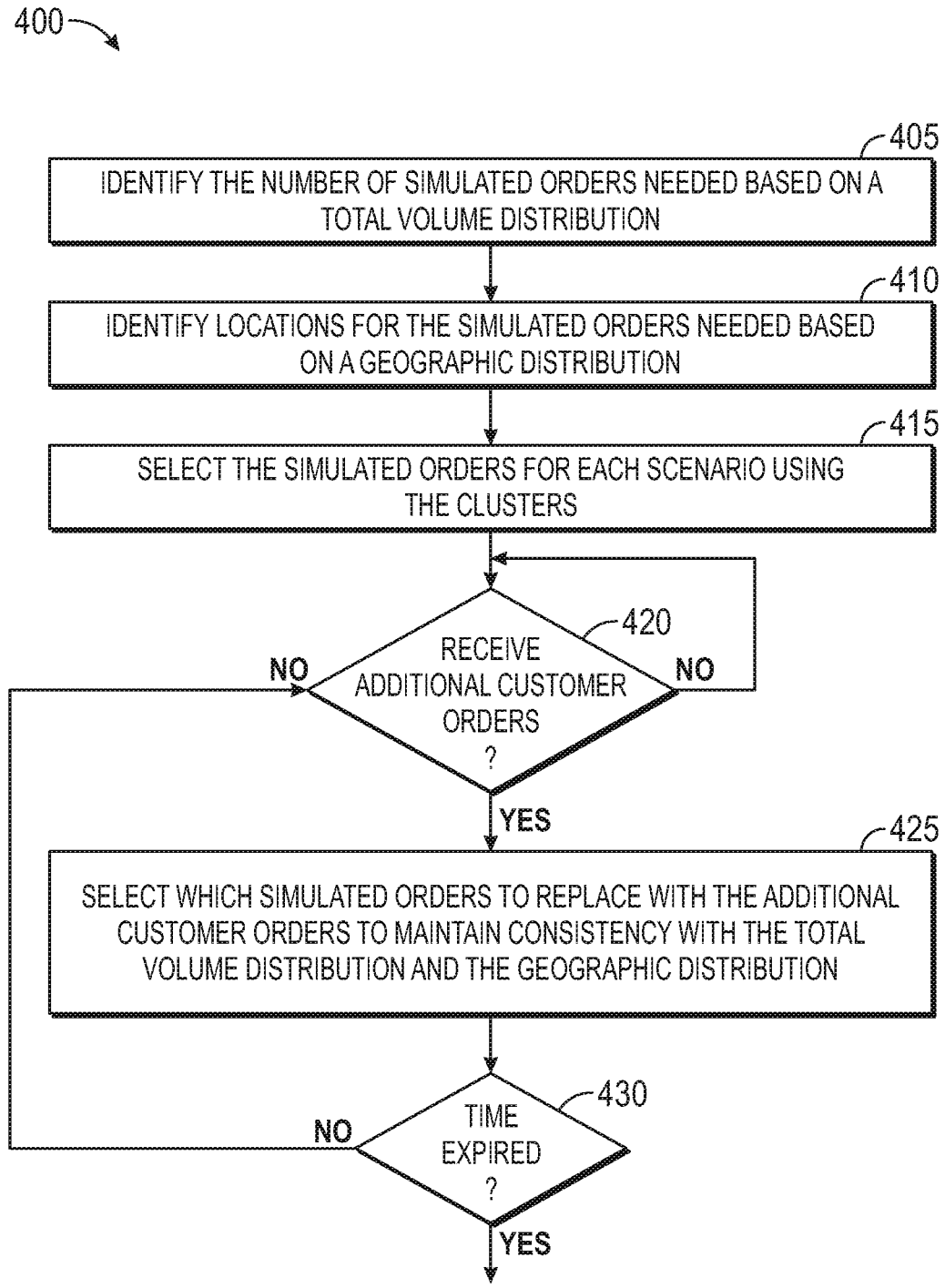
FIG. 4 is a flowchart for forecasting simulated orders in multiple demand scenarios, according to various embodiments.

FIG. 4 is a flowchart of a method 400 for forecasting simulated orders in multiple demand scenarios, according to various embodiments. In one embodiment, the method 400 provides additional detail for performing block 210 of the method 200. Moreover, the method 400 illustrates how the forecaster can replace the simulated orders in the scenarios with new customer orders as the method 400 (and the method 200) repeats.

At block 405, the forecaster identifies a number of simulated orders needed for each scenario based on the total volume distribution for each scenario. As mentioned above, the total volume distribution may be a normal distribution. The mean value and the variance (or error) in the distribution can vary based on the historical data. For example, if the current time period is 7:30-9:30 AM on a Tuesday, historical data for that same time period for the last several weeks or months may vary widely, in which case, the forecaster would increase the variance of the total volume distribution. Moreover, the mean value of the normal distribution can be adjusted to reflect the average total customer numbers for that same time period over the last several weeks or months. Further, the mean can be adjusted in response to the number of customer orders already received. For example, historical data may indicate that for the same time period, the planning system receives 60 orders but if at the beginning of the period the planning system has already received 30 orders, the mean value may be set above 60 orders.

The number of scenarios can be a user-defined parameter and be balanced with the amount of compute resources used to execute the predictive delivery planning system. At the beginning of the time period, the forecaster may use a random draw or sample to estimate the total number of customer orders for the time period for each scenario. Although the total number of customer orders is random, it is based on the total volume distribution, which if it is a normal distribution, results in the total number of customer orders being clustered around the mean of the distribution. For example, if the mean of the total volume distribution is 60 orders when the time window first starts, Scenario A may have 60 orders, Scenario B may have 55 orders, Scenario C may have 62 orders, and so forth. How spread out the total customer orders are from the mean varies according the amount of variance in the total volume distribution.

The number of simulated orders the forecaster selects is determined by subtracting the current number of received customer orders from the total customer orders for each scenario. Continuing the example above, if the planning system has received 10 orders, the forecaster selects 50 simulated orders for Scenario A, 45 orders for Scenario B, and 52 orders for Scenario C.

At block 410, the forecaster identifies locations (or addresses) for the simulated orders based on a geographic distribution. In one embodiment, the locations of the simulated orders are selected at random. In this example, the geographic distribution may be a uniform distribution indicating that orders are equally likely to be in any region in the delivery area. For example, the forecaster may select random latitude and longitude values for each simulated orders from the set of latitude and longitude values in the delivery area. As such, the simulated orders for each scenario would be equally distributed across the delivery region.

In another embodiment, instead of assuming a uniform distribution, historical data can be used to generate clusters in the delivery region to assign locations to the simulated orders which may better predict where future customer orders received in the time window will originate.

Figure 5:
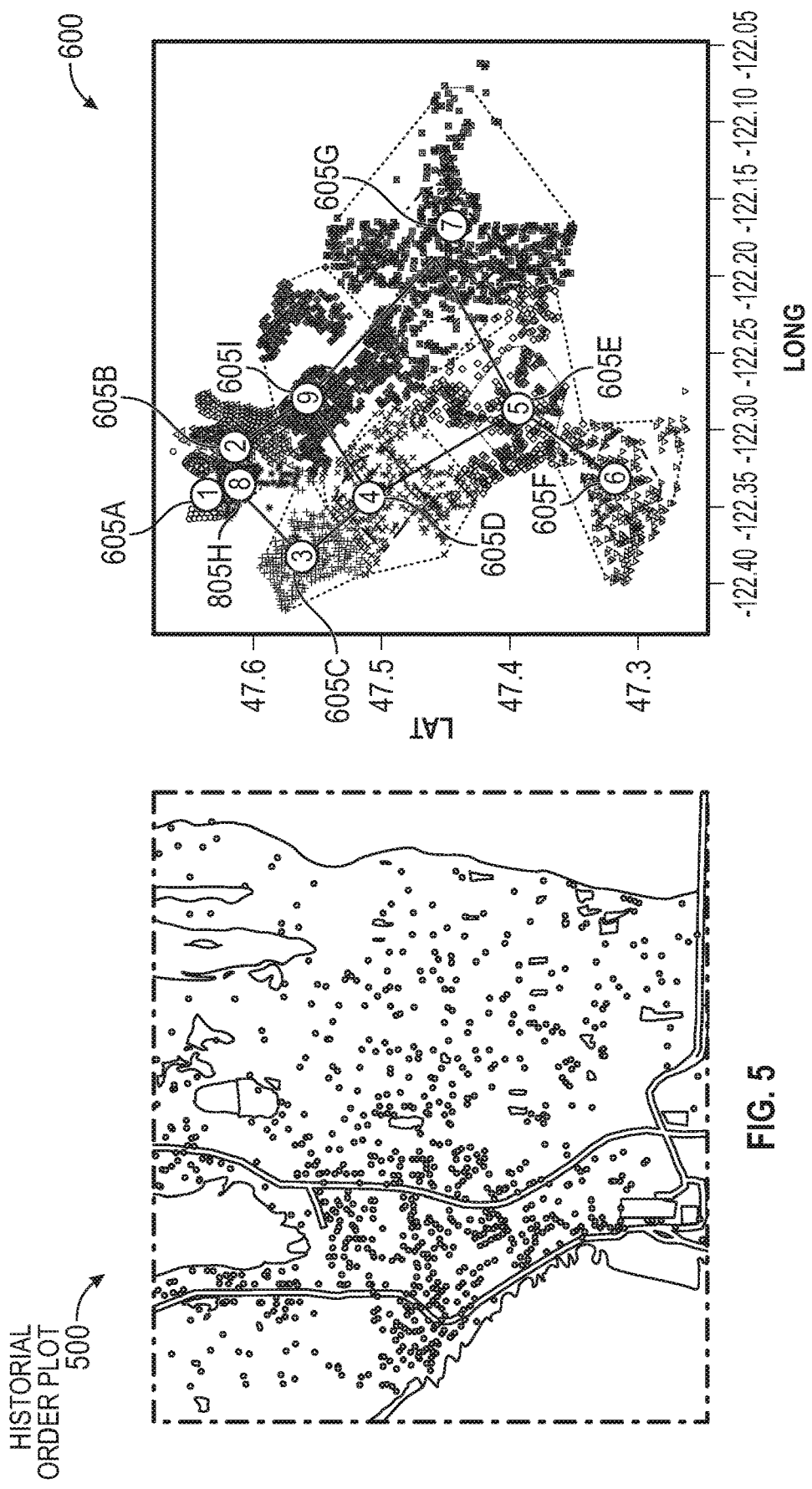
FIG. 5 is a plot of historical order data for a specified time period, according to various embodiments.

FIG. 5 is a plot 500 of historical order data for a specified time period, according to various embodiments. For example, the plot 500 may indicate the locations of the customer orders received at the same time period as the current time period but on a different day. For example, if the current time period is 7:30-7:45 AM on a Tuesday, the plot 500 may illustrate the locations of the customer orders received at 7:30-7:45 AM on a Tuesday for the previous week.

In another example, the plot 500 may include the locations of customer order for a plurality of previous days at the same time period—e.g., the customer orders received at 7:30-7:45 AM on Tuesday of the previous three weeks. Regardless, using the plot 500, the forecaster can group the orders into different clusters which sub-divide the delivery area—i.e., the total area of plot 500.

Figure 6:
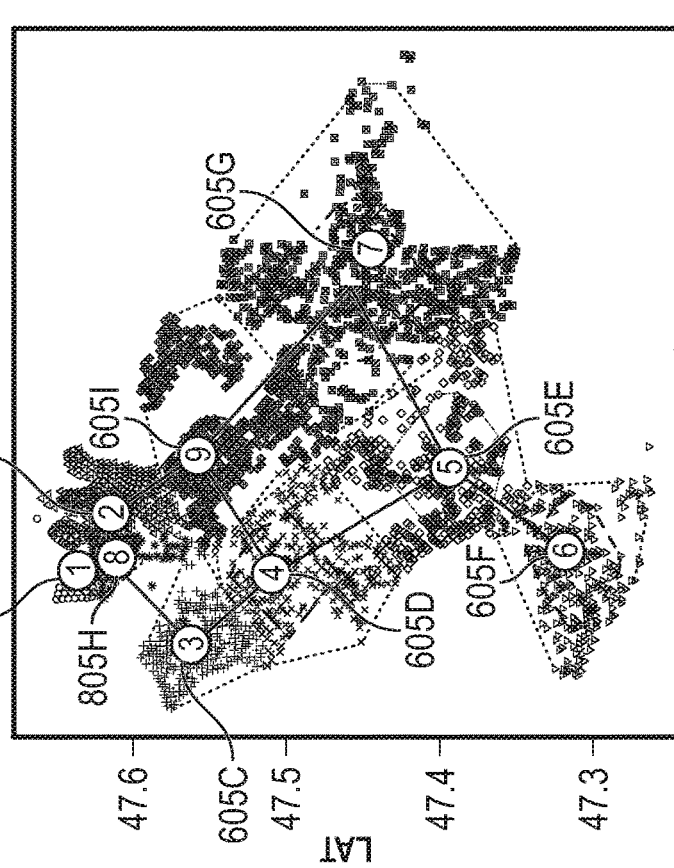
FIG. 6 is a chart illustrating clusters dividing up a geographic region, according to various embodiments.

FIG. 6 is a chart 600 illustrating clusters 605 dividing up the geographic region of plot 500 in FIG. 5, according to various embodiments. As shown, there are nine clusters 605A-605I which subdivide the delivery area into different regions. The forecaster can use any suitable clustering technique on the historical data to form the clusters 605— e.g., a k-means cluster decomposition.

In one embodiment, the forecaster assumes that the customer orders are uniformly distributed within each cluster. The forecaster can assign a weight to each cluster that can be used to determine how many of the simulated orders should be in each of the clusters. For example, the forecaster may determine that 10% of the simulated orders should be selected within the cluster 605A, 20% of simulated orders from cluster 605B, 40% of the simulated orders from cluster 605C, and 30% of the simulated orders from cluster 605D, while the remaining clusters 605E-605I do not include any of the simulated orders. However, in other example, each of the clusters 605 may include some percentage of the simulated orders.

The forecaster can use the weights to ensure the geographic locations of both the actual customer orders and the simulated orders match the geographic distributions. For example, if the weights indicate that 20% of the total orders are predicted to come from cluster 605B and the planning system has already received customer orders from the cluster 605B that are 20% of the total predicted number of customer numbers, the forecaster does not select any simulated orders from that cluster. However, if the already received customer numbers in cluster 605B do not amount to 20% of the total predicted number of customer orders, the forecaster can select simulated orders from the cluster 605B until the 20% weight is achieved.

Returning to the method 400, at block 415, the forecaster selects the simulated orders for each scenario using the clusters. For example, the forecaster can use the weights to select simulated orders from the clusters 605. In one embodiment, the forecaster chooses simulated orders from the previous customer orders in that cluster. For example, the forecaster may use the plot 500 in FIG. 5 to identify the previous customer orders in the clusters 605 and then select simulated orders from those subsets. In one embodiment, the forecaster may assume the orders in each cluster are uniformly distributed, and thus, selects any of the previous customer orders at random to be the simulated orders. As mentioned above, the forecaster can select the simulated orders for each scenario so that the distribution of the simulated orders and the actual customer orders match the weights assigned to each cluster 605. In another embodiment, rather than using previous customer orders as the simulated orders, the forecaster can choose random latitude and longitude values within the clusters 605 to use as addresses for the simulated orders.

At block 420, the planning system determines whether, during a subsequent time interval, additional customer orders have been received. If not, the method 400 can continue to wait until additional orders arrive, for example, in the next time interval.

However, if the planning system has received additional customer orders, at block 425, the forecaster selects which simulated orders to replace with the additional customer orders to maintain consistency with the total volume distribution and the geographic distribution. That is, rather than randomly replacing a portion of the simulated orders in each scenario with the newly received customer orders, the forecaster can replace simulated orders in a manner that maintains the total volume predicted by the total volume distribution and the locations of the orders predicted by the geographic distribution.

In one embodiment, the total volume distribution and the geographic distribution can change during each interval in the time window. For example, the total volume distribution corresponding to the time interval between 7:30-7:45 AM may be different than the total volume distribution corresponding to the time interval between 7:45-8:00 AM (i.e., the next time interval in the time window). As a result, the forecaster can change the total forecasted number of customer orders for each of the scenarios. Put differently, the total number of customer orders in the each of the scenarios can change at each interval in the time window.

Figure 7:
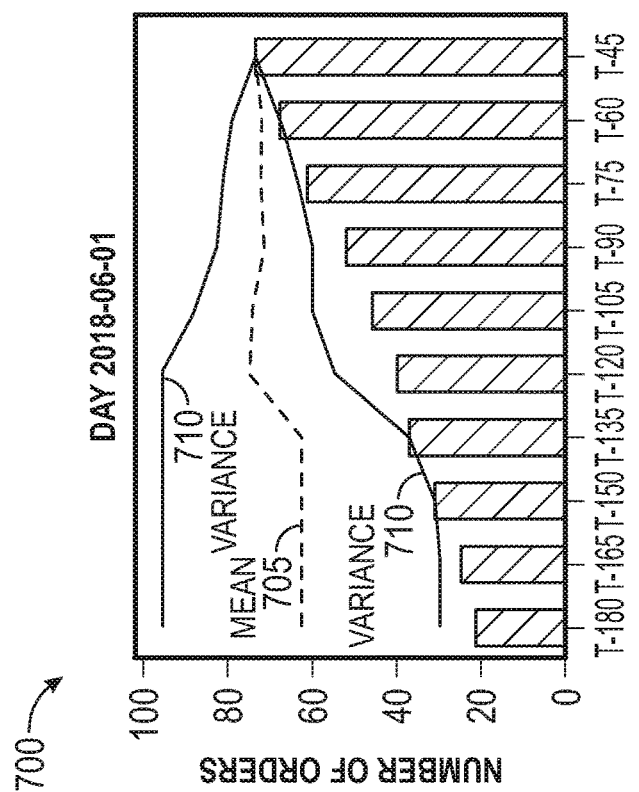
FIG. 7 is a chart illustrating customer orders over time, according to various embodiments.

FIG. 7 is a chart 700 illustrating customer orders over time, according to various embodiments. In chart 700, the line 705 is the mean of the total volume distribution which can change over the time intervals (e.g., fifteen minute intervals) for the time window—i.e., T-180 to T-45. For example, as more customer orders are received, the forecaster can update the mean of the total volume distribution to better predict the total number of customer orders that will be received by the end of the time window.

The lines 710 illustrate the variance of the total volume distribution which decrease as the current time reaches the end of the time window—i.e., T-45. Put differently, as the current time gets closer to the end of the time window, the variance (or error) in the mean of the total volume distribution approaches zero. The variance can vary depending on how accurately the current number of customer orders matches the historical data, thereby indicating the accuracy of the mean. Moreover, the variance can change depending on the amount of time before the end of the period since predictions made at the beginning of the time period (when few customers orders have been received) is less accurate than when more customer orders have been received near the end of the time window.

The bars represent the total number of customer orders received by the planning system at each of the time intervals. That is, at time T-180, the planning system has received 21 orders, at time T-165, the system has received 24 orders, and so forth. As time progress, the number of customer orders approaches the line 705 representing the mean of the total volume distribution. That is, the line 705 for the mean, the lines 710 for the variance, and the total number of customer orders converge at the end of the time window.

Figure 8:
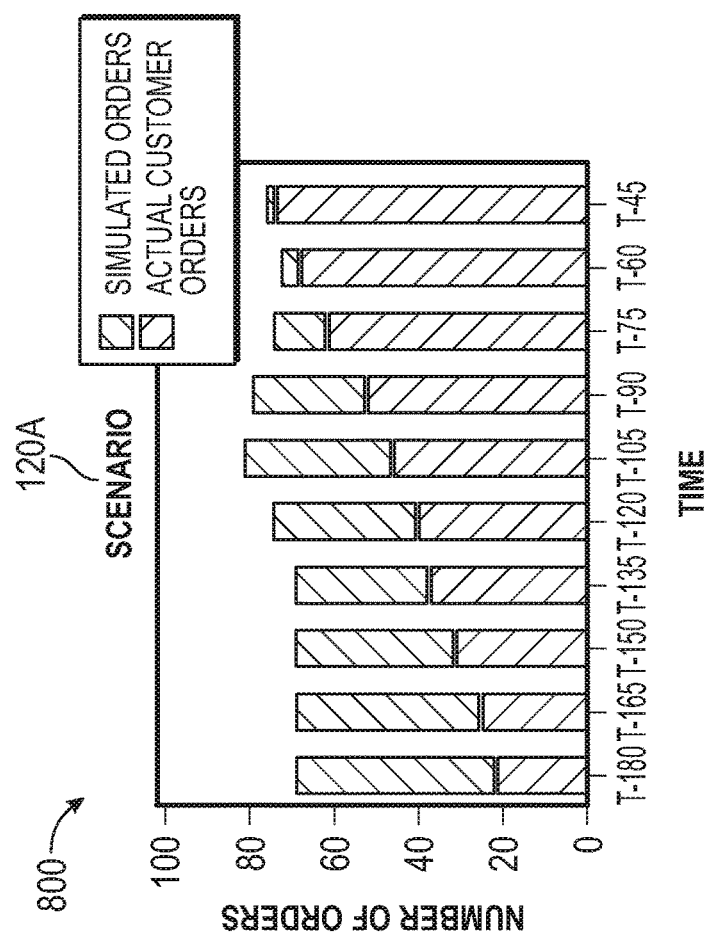
FIG. 8 is a chart illustrating simulated orders and customer orders for a particular demand scenario over time, according to various embodiments.

FIG. 8 is a chart 800 illustrating simulated orders and customer orders for a particular demand scenario over time, according to various embodiments. In this example, the chart 800 illustrates the simulated orders for the scenario 120A. The total number of customer orders predicted by the scenario 120A is the summation of the simulated orders and the actual customer orders.

As illustrated in FIG. 7, the total volume distribution (e.g., its mean and variance) can change during the time window. As such, the total predicted customer numbers shown in chart 800 also changes. However, at times T-180 through T-135, the total predicted customer orders does not change. Thus, when new customer orders arrive during each interval, the forecaster removes a corresponding number of simulated orders so that the total predicted number of customer orders remains constant. However, during intervals T-120 and T-105, the total number increases, thus, the forecaster may add simulated orders (assuming there were not enough customer orders to account for the total increase in the predicted customer orders). Thus, the forecaster may both remove and add simulated orders during the time window.

In addition to changes in the total predicted customer number, the geographic distribution can change. For example, during each interval, the weights assigned to the different clusters may change. Thus, the forecaster may remove simulated orders from the clusters where the weight decreased relative to its weight in the previous time interval. In other words, the forecaster removes or adds the simulated orders according to the new updated weights. In this manner, the forecaster can update the scenarios so that the total number of simulated/actual orders and their locations are consistent with the updated total volume distribution and geographic distribution.

At block 430, the planning system determines whether the time window has expired. If so, the planning system proceeds to the flowchart in FIG. 12. If not, the method 400 returns to block 420 where the forecaster waits for additional customer orders, updates the total volume and geographic distributions, and then removes/adds the simulated orders from each scenario to maintain consistency with those distributions.

Figure 9:
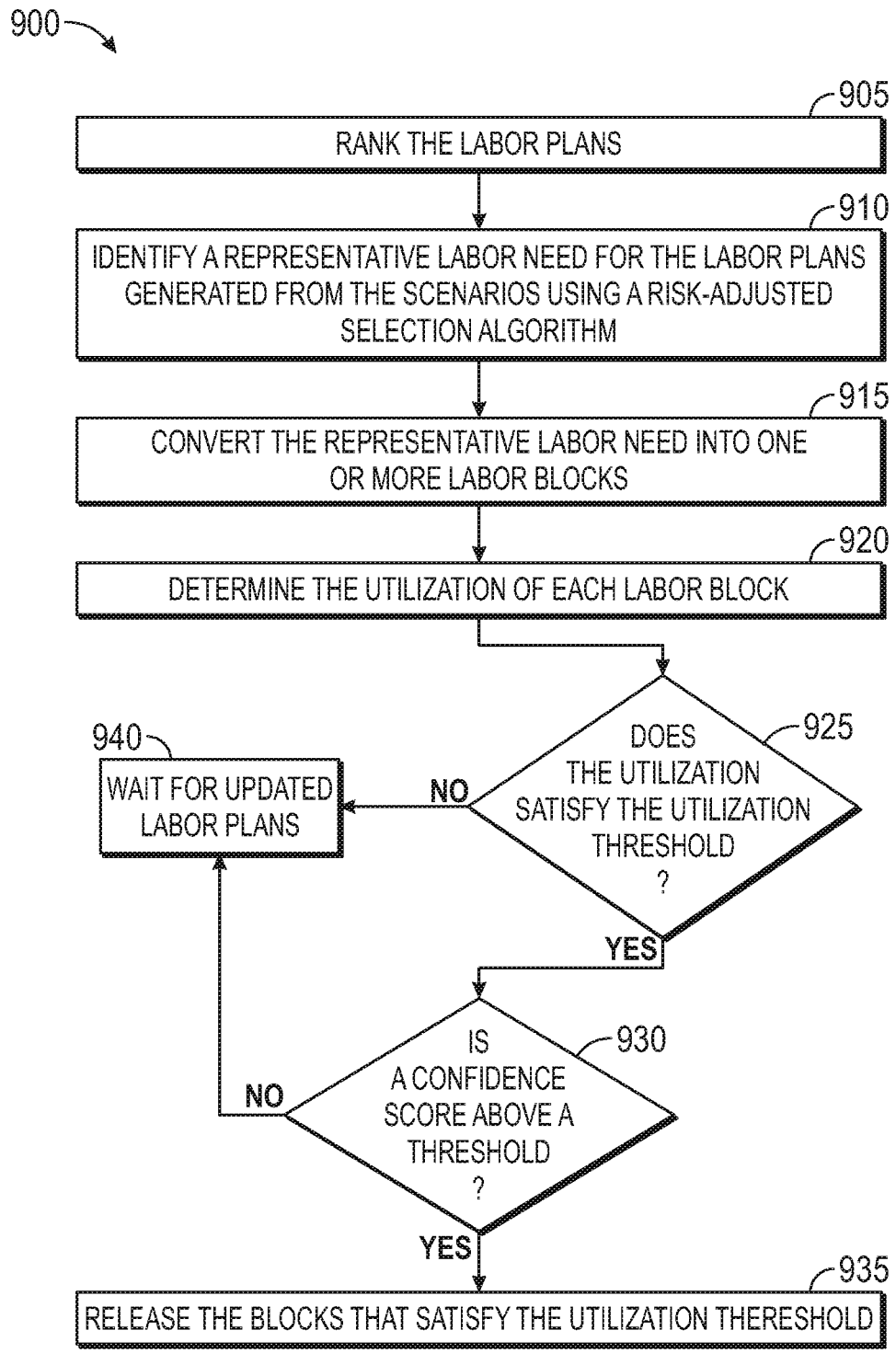
FIG. 9 is a flowchart for releasing labor blocks in response to labor plans corresponding to the demand scenarios, according to various embodiments.

FIG. 9 is a flowchart of a method 900 for releasing labor blocks in response to labor plans corresponding to the demand scenarios, according to various embodiments. In one embodiment, the method 900 provides additional details for performing blocks 225, 230, and 235 of the method 200. That is, method 900 may be performed after receiving labor plans derived from planning routes for the simulated and actual customer orders for each scenario.

Figure 10:
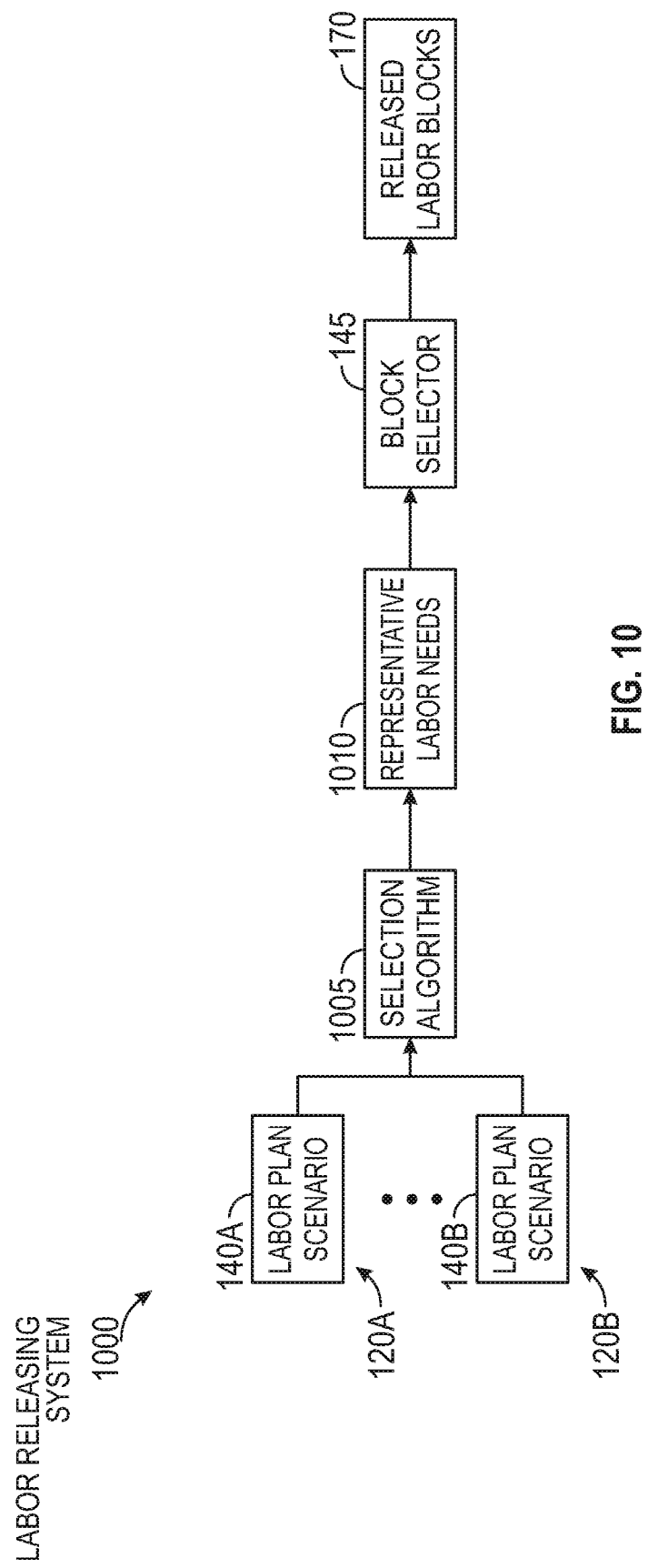
FIG. 10 illustrates data flow in a labor releasing system, according to various embodiments.

For clarity, the blocks of method 900 are discussed in tandem with FIG. 10 which illustrates data flow in a labor releasing system, according to various embodiments. At block 905, the block selector 145 ranks the labor plans 140. In one embodiment, the block selector 145 stacks the labor plans 140 from longest (i.e., the labor plan that requires the most time to complete) to shortest (i.e., the labor plan that requires the least amount of time to complete).

At block 910, the block selector 145 identifies representative labor needs 1010 for the labor plans 140 generated from the scenarios using a risk-adjusted selection algorithm 1005. Although the selection algorithm 1005 may vary, in one embodiment, the selection algorithm 1005 is a risk adverse algorithm which creates representative labor needs 1010 that cover all labor needs of the scenario. In this example, the representative labor needs 1010 corresponds to the longest labor plan 140. That is, if the longest labor plan 140 is 200 minutes, than the representative labor needs 1010 is 200 minutes.

In another embodiment, the selection algorithm 1005 is an average risk algorithm which creates representative labor needs 1010 taking the average of the labor need of the scenarios. In this example, the block selector 145 identifies the average time of all the labor plans which is then assigned as the representative labor needs 1010.

Regardless of the technique for selecting the representative labor needs 1010, the block selector 145 converts the representative labor needs into one or more labor blocks (i.e., a set of labor blocks). As mentioned above, the labor blocks may have minimum requirements—e.g., at least a 1 hour minimum and have 30 minutes increments—which may better match the drivers' preferences. For example, if the representative labor needs 1010 is 110 minutes, the block selector 145 may round up to form a 2 hour labor block or two 1 hour labor blocks.

At block 920, the block selector determines the utilization of each labor block formed at block 915. In one embodiment, the block selector 145 assumes that all labor blocks, when released, are accepted. The block selector 145 releases a block if the expected utilization of the constructed block is above a predetermined threshold. Equation 1 provides one technique for calculating the utilization of the set of labor blocks derived from the representative labor needs:

$$E(u_b) = \frac{1}{n} \sum_{s \in S} \frac{\hat{L}_b^s}{L_b} \forall\, b \in B \quad (1)$$

Where, $u_b$ is the utilization of block b, B is the set of all blocks created from the representative labor needs, S is the set of all scenarios, n is the number of scenarios, $\hat{L}_b^s$ is the length of block s, b is the length of labor need from scenario s that will be covered by labor block $u_b$ (if labor block b does not cover any labor need of scenario s, then, $\hat{L}_b^s$ is 0), and each scenario is equally likely to happen. The utilization metric defined by Equation 1 aids the block selector 145 to identify blocks that maximize the block utilization as well as the expected utilization provides insight on how many of the scenarios are covering each block (the lower the number of scenarios covered, the lower the expected utilization and vice versa). That is, the labor block is assigned a higher utilization score if the labor block includes sufficient time for performing the labor plans of multiple scenarios. Also, Equation 1 changes in response to how well the length determined for each block matches the labor need used to create each block.

In one embodiment, the utilization is related to cost per delivery (e.g., the cost of delivering each package to the customer). A higher utilization of the labor blocks can improve efficiency, in terms of using the available labor time. Therefore, when maximizing the block utilization of the solution that minimizes the total delivery time, then the block selector 145 indirectly, minimizes the cost per delivery.

While Equation 1 derives the expected utilization assuming that all the released blocks are accepted, i.e., the fill-rate is 100%, in practice this may not happen. For a given block, the fill rate should be higher if the block selector 145 releases the blocks earlier. If $f_t$ is the fill rate at time t, then it is expected that $f_t$ decreases with the time. Given an estimation of $f_t$, the expected utilization of block b if it is released at time t (referred to as $u_b^t$) can be expressed as Equation 2:

$$E(u_b^t) = \frac{1}{n} \sum_{s \in S} f_t \frac{\hat{L}_b^s}{L_b} \forall\, b \in B \quad (2)$$

Note that when $f_t$=1 then Equation 2 is the same as Equation 1.

At block 925, the block selector 145 determines whether the expected utilization of each block in the set of labor blocks generated at block 915 satisfy a predefined threshold.

FIG. 11 is a chart 1100 illustrating releasing labor blocks using different predefined thresholds, according to various embodiments. The chart 1100 includes releasing blocks for the same set of scenarios but using different thresholds. The higher the threshold, the higher the utilization scores must be in order to release the time to delivery drivers. As a result, at time T-180 when the planning system first performs the method 900, using the lowest utilization threshold (e.g., 0.7) results in releasing more labor blocks than using the higher utilization thresholds (e.g., 0.8 and 0.9). While selecting a higher threshold can result in releasing labor blocks earlier (which increases the likelihood the blocks will be selected without having to use surge pricing), the labor blocks are more tentative, and thus, the planning system may release blocks that are not needed.

Chart 1100 further illustrates that some intervals (e.g., fifteen minute intervals), the planning system may not release any of the labor blocks. That is, when repeating method 900, the planning system may determine that none of the labor blocks meet the utilization threshold, and thus, none are released. As the time window progresses, the scenarios begin to converge as discussed above which can increase the expected utilization. For example, the labor blocks may begin to satisfy the labor plans in more scenarios which increases the expected utilization calculated by Equations 1 or 2. The larger the threshold, the later the blocks are expected to be released, when the forecast is more accurate. Because the planning system accounts for the geolocation of the already realized orders, the potential geolocation of the forecasted orders, and the travel times for the instance, then it is able to compute more accurately the expected utilization and delivery efficiency, and therefore the expected requirement of labor hours.

Returning to the method 900, if at least one of the expected utilization scores satisfies the predefined utilization threshold, the method 900 proceeds to block 930 to determine whether a confidence score is above a threshold. For example, the confidence score can be derived from block utilization based on simulations, e.g., a route that appears in multiple scenarios can be released with a high confidence earlier in the planning time window. The confidence score can be derived to reflect the risk in the release policy, where the greater the utilization threshold, the reduced risk that the planning system will release more labor blocks than are needed. On the other hand, increasing the utilization threshold can increase the risk.

If the confidence score is above a threshold, at block 935, the block selector 145 releases the labor blocks that satisfy the utilization threshold. However, if either the utilization threshold or the confidence threshold is not satisfied, the method 900 proceeds to block 940 where the planning system waits for updated labor planes. Once additional labor plans are received, the method 900 may repeat.

Further, the released labor blocks can be used to set the labor plans. For example, if two 1 hour labor blocks have already been released and an updated labor plan for a scenario indicates it uses 200 minutes, the block selector may subtract the 120 minutes of the two 1 hour labor blocks from the 200 minutes of the labor plan to result in a labor plan of 80 minutes. The method 900 can then repeat to determine whether additional labor blocks can be released.

Figure 12:
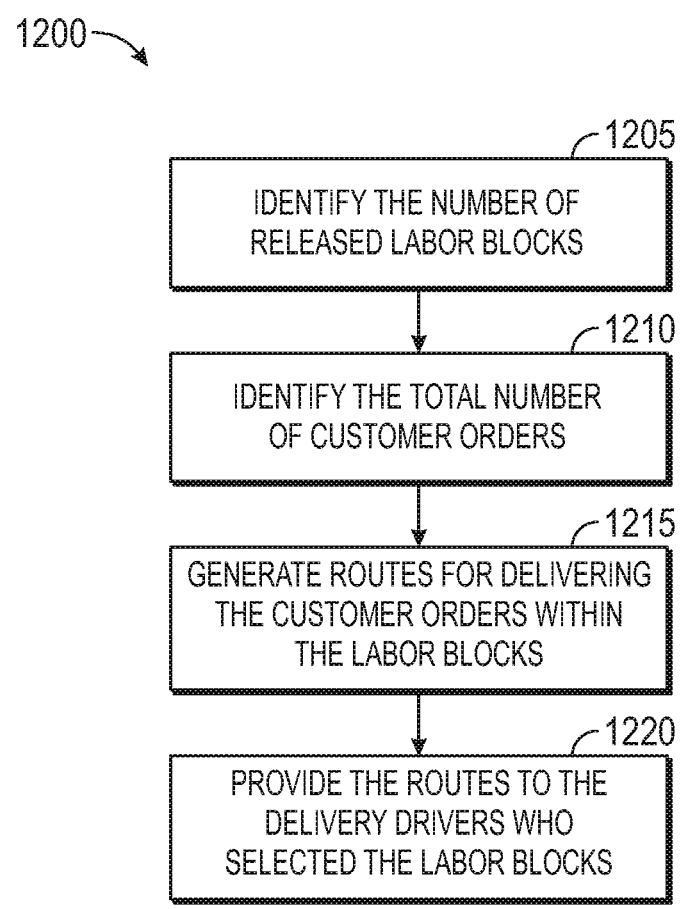
FIG. 12 is a flowchart for assigning routes to delivery drivers who selected the released labor blocks, according to various embodiments.

FIG. 12 is a flowchart of a method 1200 for assigning routes to delivery drivers who selected the released labor blocks, according to various embodiments. In one embodiment, the method 1200 is performed after the time window for accepting customer orders is complete. Using FIG. 11 as an example, the time window for accepting orders is from T-180 to T-45. Once T-45 has expired, the planning system can use the labor blocks selected from the delivery drivers to assign the routes.

At block 1205, the planning system identifies the total number of released labor blocks and which labor blocks were selected by the delivery drivers. For example, some of the labor blocks may not have been selected. If not enough labor blocks were selected, the planning system can use surge pricing (increase the amount of money paid to the delivery driver) to entice a driver to select the remaining released labor blocks.

At block 1210, the planning system identifies the total number of customer orders. Now that the time window has closed, the planning system may remove all the remaining simulated orders so that only the actual customer orders remain.

At block 1215, the planning system generates routes for delivering the customer orders within the labor blocks. That is, the selected labor blocks and the actual customer orders are inputs into the route planner which once again identifies optimal routes for delivering the customer orders. In one embodiment, the route planning identifies the optimized routes for delivering the customer goods within the time allotted by the labor blocks. Moreover, the route planner may also use any of the inputs discussed above when preparing the simulated routes (which included both simulated and actual customer orders) to prepare the actual routes used by the delivery drivers.

At block 1220, the planning system provides the routes to the delivery drivers who selected the labor blocks. With their routes now assigned, the delivery drivers can retrieve the packages at a predefined location (e.g., a warehouse) and begin their routes. Ideally, the route or routes provided to the delivery drivers are performed within the amount of time of the labor blocks selected by the delivery driver.

Once the planning system has finished accepting orders for a first time window, the planning system may begin to accept orders for the next time window. Thus, while the planning system performs the method 1200 for the previous time window, in parallel the planning system can begin collecting customer orders for the next time window and performing the method 200 in FIG. 2.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
  receiving customer orders at a first time interval in a predefined time window;
  identifying, using one or more computer processors, total numbers of customer orders predicted by a plurality of scenarios based on a total volume distribution, wherein:
    the total volume distribution is based on historical customer orders and the received customer orders,
    the plurality of scenarios have different total numbers of customer orders,
    the total volume distribution is a normal distribution,
    a mean of the normal distribution is based on current time of day of the first time interval and historical orders received at a same time of day in a previous week, and a variance of the normal distribution is based on an error between the received customer orders and the historical orders received at the same time of day in the previous week, generating simulated orders for each of the plurality of scenarios, wherein the simulated orders represent a difference between the total number of customer orders for each of the plurality of scenarios and the received customer orders;

identifying geographic locations of the simulated orders for each of the plurality of scenarios based on a geographic distribution, wherein the geographic distribution is based on historical customer orders in a delivery region;

generating, using a delivery problem solver, one or more delivery routes for each of the plurality of scenarios based on the received customer orders and the geographic locations of the simulated orders;

converting the one or more delivery routes into labor plans;

identifying a set of labor blocks from the labor plans, each labor block in the set of labor blocks indicating a length of time a delivery driver can select to work;

determining an expected utilization score for each labor block in the set of labor blocks using a utilization algorithm, the expected utilization score representing a likelihood the labor block will be needed to deliver the received customer orders at an end of the predefined time window;

releasing labor blocks in the set of the labor blocks whose expected utilization scores exceed a threshold utilization, wherein releasing the labor blocks permits the delivery driver to select the labor blocks;

during subsequent time intervals in the predefined time window:
  receiving additional customer orders,
  updating the total numbers of customer orders in each of the plurality of scenarios,
  adjusting the simulated orders assigned to each of the plurality of scenarios,
  identifying a new set of labor blocks based on updated labor plans for the plurality of scenarios, and
  releasing additional labor blocks from the new set of labor blocks whose expected utilization scores exceed the threshold utilization, transmitting, for display on a user device, the released labor blocks to the delivery driver for the delivery driver to select;

updating, in real-time, the labor blocks selected by the delivery driver; and transmitting, for display on the user device, real-time updates indicating a new set of released labor blocks for selection by the delivery driver, wherein the real-time updates incorporate new customer orders that are received, and wherein the real-time updates incorporate released labor blocks selected by other delivery drivers.

2. The method of claim 1, further comprising:
determining that the predefined time window has expired;
generating routes for delivering customer orders received during the predefined time window; and
providing the routes to the delivery drivers who previously selected the released labor blocks.

3. The method of claim 1, wherein identifying the total numbers of customer orders based on the total volume distribution comprises:
selecting a random draw using the total volume distribution for each of the plurality of scenarios, wherein the total number of customer orders for each scenario is a prediction of an expected number of customer orders that will be received during the predefined time window.

4. The method of claim 3, wherein adjusting the simulated orders assigned to each of the plurality of scenarios comprises:
adjusting the mean and variance of the total volume distribution based on a current time of day of the subsequent time intervals; and
changing the total numbers of customer orders for the plurality of scenarios based on the adjusted mean and variance of the total volume distribution.

5. The method of claim 1, wherein adjusting the simulated orders assigned to each of the plurality of scenarios comprises:
selecting at least one of the simulated orders to replace with one of the additional customer orders to maintain consistency with the total volume distribution and the geographic distribution.

6. A method comprising:
receiving customer orders at a first time interval;
identifying, using one or more computer processors, total numbers of customer orders predicted by a plurality of scenarios based on a volume distribution, wherein:
  the volume distribution is based on historical customer orders and the received customer orders, and
  each of the total numbers of customer orders is a prediction, for a respective one of the plurality of scenarios, of an expected number of customer orders that will be received during a time window that includes the first time interval, generating simulated orders for each of the plurality of scenarios, wherein the simulated orders represent a difference between the total number of customer orders for each of the plurality of scenarios and the received customer orders;

identifying geographic locations of the simulated orders for each of the plurality of scenarios based on a geographic distribution, wherein the geographic distribution is based on historical customer orders in a delivery region, and wherein identifying the geographic locations of the simulated orders further comprises:
  generating a plurality of clusters in the delivery region based on historical data,
  assigning a weight to each of the clusters, the weight indicating a likelihood that a customer order will be received from the respective cluster during the time window, and
  assigning the geographic locations to the simulated orders based on the weights, generating, using a delivery problem solver, one or more delivery routes for each of the plurality of scenarios based on the received customer orders and the geographic locations of the simulated orders;

identifying a set of labor blocks from the one or more delivery routes, each labor block in the set of labor blocks indicating a length of time a person can select to work;

calculating expected utilization scores for the set of labor blocks using a utilization algorithm, wherein the expected utilization scores indicate the likelihood the labor blocks will be needed to satisfy the total number of customer orders received during the time window;

releasing labor blocks in the set of the labor blocks based on the expected utilization scores for the released labor blocks satisfying a threshold utilization;

transmitting, for display on a user device, the released labor blocks to a delivery driver for the delivery driver to select;
updating, in real-time, the labor blocks selected by the delivery driver; and
transmitting, for display on the user device, real-time updates indicating a new set of released labor blocks for selection by the delivery driver, wherein the real-time updates incorporate new customer orders that are received, and wherein the real-time updates incorporate released labor blocks selected by other delivery drivers.

7. The method of claim 6, further comprising:
during a second time interval in the time window:
receiving additional customer orders,
updating the total numbers of customer orders in each of the plurality of scenarios based on the additional customer orders,
adjusting the simulated orders assigned to each of the plurality of scenarios based on updating the total numbers of customer orders,
generating new one or more routes for each of the plurality of scenarios based on the adjusted simulated orders and the additional customer orders,
identifying a new set of labor blocks based on the new one or more routes, and
releasing additional labor blocks from the new set of labor blocks whose expected utilization scores exceed the threshold utilization.

8. The method of claim 7, wherein adjusting the simulated orders assigned to each of the plurality of scenarios comprises:
adjusting a mean and a variance of the volume distribution based on a current time of day of the second time interval;
changing the total numbers of customer orders for the plurality of scenarios based on the adjusted mean and variance of a total volume distribution; and
selecting at least one of the simulated orders to replace with one of the additional customer orders to maintain consistency with the total volume distribution and the geographic distribution.

9. The method of claim 6, further comprising:
receiving additional customer orders in a second time interval in the time window;
updating the weights assigned to the clusters based the additional customer orders thereby updating the geographic distribution;
selecting one of the simulated orders to remove from one of the clusters based on the updated weights; and
replacing the removed simulated order with one of the additional customer orders.

10. The method of claim 6, wherein identifying the set of labor blocks from the one or more delivery routes comprises:
converting the one or more delivery routes into labor plans for the plurality of scenarios;
selecting a representative labor need from the labor plans based on a risk-adjusted selection algorithm; and
converting the representative labor need into the set of labor blocks, wherein an amount of time defined by each labor block in the set of labor blocks satisfies a predefined minimum time period.

11. The method of claim 10, further comprising:
determining the expected utilization scores for each labor block in the set of labor blocks, wherein the expected utilization scores increase as a number of the plurality of scenarios that have labor plans covered by the labor blocks increase.

12. The method of claim 11, wherein the expected utilization scores are determined based on an estimated fill-rate indicating a likelihood the labor blocks in the set of labor blocks will be selected by the person before the time window expires.

13. A predictive delivery planning system, comprising:
a processor; and
memory comprising an application, wherein the application is configured to, when executed by the processor, perform an operation, the operation comprises:
receiving customer orders at a first time interval;
identifying, using one or more computer processors, total numbers of customer orders predicted by a plurality of scenarios based on a volume distribution, wherein:
the volume distribution is based on historical customer orders and the received customer orders, and
each of the total numbers of customer orders is prediction, for a respective one of the plurality of scenarios, of an expected number of customer orders that will be received during a time window that includes the first time interval,
generating simulated orders for each of the plurality of scenarios, wherein the simulated orders represent a difference between the total number of customer orders for each of the plurality of scenarios and the received customer orders;
identifying geographic locations of the simulated orders for each of the plurality of scenarios based on a geographic distribution, wherein the geographic distribution is based on historical customer orders in a delivery region;
generating, using a delivery problem solver, one or more delivery routes for each of the plurality of scenarios based on the received customer orders and the geographic locations of the simulated orders;
identifying a set of labor blocks from the one or more delivery routes, each labor block in the set of labor blocks indicating a length of time a person can select to work, wherein identifying the set of labor blocks from the one or more delivery routes further comprises:
converting the one or more delivery routes into labor plans for the plurality of scenarios,
selecting a representative labor need from the labor plans based on a risk-adjusted selection algorithm, and
converting the representative labor need into the set of labor blocks, wherein an amount of time defined by each labor block in the set of labor blocks satisfies a predefined minimum time period,
calculating expected utilization scores for the set of labor blocks using a utilization algorithm, wherein the expected utilization scores indicate the likelihood the labor blocks will be needed to satisfy the total number of customer orders received during the time window;
releasing labor blocks in the set of the labor blocks based on the expected utilization scores for the released labor blocks satisfying a threshold utilization;

transmitting, for display on a user device, the released labor blocks to a delivery driver for the delivery driver to select;

updating, in real-time, the labor blocks selected by the delivery driver; and transmitting, for display on the user device, real-time updates indicating a new set of released labor blocks for selection by the delivery driver, wherein the real-time updates incorporate new customer orders that are received, and wherein the real-time updates incorporate released labor blocks selected by other delivery drivers.

14. The predictive delivery planning system of claim 13, wherein the operation further comprises:

during a second time interval in the time window:
receiving additional customer orders,
updating the total numbers of customer orders in each of the plurality of scenarios based on the additional customer orders,
adjusting the simulated orders assigned to each of the plurality of scenarios based on updating the total numbers of customer orders,
generating new one or more routes for each of the plurality of scenarios based on the adjusted simulated orders and the additional customer orders,
identifying a new set of labor blocks based on the new one or more routes, and
releasing additional labor blocks from the new set of labor blocks whose expected utilization scores exceed the threshold utilization.

15. The predictive delivery planning system of claim 14, wherein adjusting the simulated orders assigned to each of the plurality of scenarios comprises:

adjusting a mean and a variance of the volume distribution based on a current time of day of the second time interval;

changing the total numbers of customer orders for the plurality of scenarios based on the adjusted mean and variance of a total volume distribution; and selecting at least one of the simulated orders to replace with one of the additional customer orders to maintain consistency with the total volume distribution and the geographic distribution.

16. The predictive delivery planning system of claim 13, wherein identifying the geographic locations of the simulated orders for each of the plurality of scenarios comprises:

generating a plurality of clusters in the delivery region based on historical data;

assigning a weight to each of the clusters, the weight indicating a likelihood that a customer order will be received from the respective cluster during the time window; and assigning the geographic locations to the simulated orders based on the weights.

17. The predictive delivery planning system of claim 16, wherein the operation further comprises:

receiving additional customer orders in a second time interval in the time window;

updating the weights assigned to the clusters based the additional customer orders thereby updating the geographic distribution;

selecting one of the simulated orders to remove from one of the clusters based on the updated weights; and replacing the removed simulated order with one of the additional customer orders.

18. The predictive delivery planning system of claim 13, wherein identifying the set of labor blocks from the one or more delivery routes further comprises:

determining the expected utilization scores for each labor block in the set of labor blocks, wherein the expected utilization scores increase as a number of the plurality of scenarios that have labor plans covered by the labor blocks increase.

* * * * *